(12) United States Patent
Heyerdal et al.

(10) Patent No.: US 11,549,725 B2
(45) Date of Patent: Jan. 10, 2023

(54) SYSTEM FOR STORING AND RETRIEVING THERMAL ENERGY

(71) Applicant: NMBU, Ås (NO)

(72) Inventors: Petter Hieronymus Heyerdal, Ås (NO); Johan Wilhelm Huus-Hansen, Eiksmarka (NO)

(73) Assignee: NMBU, Ås (NO)

( * ) Notice: Subject to any disclaimer, the term of this patent is extended or adjusted under 35 U.S.C. 154(b) by 501 days.

(21) Appl. No.: 16/319,790

(22) PCT Filed: Jul. 21, 2017

(86) PCT No.: PCT/NO2017/050198
§ 371 (c)(1),
(2) Date: Jan. 22, 2019

(87) PCT Pub. No.: WO2018/016972
PCT Pub. Date: Jan. 25, 2018

(65) Prior Publication Data
US 2020/0158379 A1    May 21, 2020

(30) Foreign Application Priority Data
Jul. 22, 2016    (NO) .............................. NO20161218

(51) Int. Cl.
*F24T 10/00* (2018.01)
*F24S 60/00* (2018.01)
(Continued)

(52) U.S. Cl.
CPC ............ *F24S 60/00* (2018.05); *F24S 10/506* (2018.05); *F24S 20/67* (2018.05); *F24S 80/65* (2018.05); *F28D 20/0052* (2013.01)

(58) Field of Classification Search
CPC ......... F24T 10/00; F24F 5/0046; F24F 5/005; F24F 2005/0057
See application file for complete search history.

(56) References Cited

U.S. PATENT DOCUMENTS

| 4,328,790 A | 5/1982 | Kircus | |
| 4,445,499 A * | 5/1984 | Platell | F24T 10/17 126/400 |

(Continued)

FOREIGN PATENT DOCUMENTS

| CH | 706507 A1 | 11/2013 |
| CN | 102607185 A | 7/2012 |

(Continued)

OTHER PUBLICATIONS

International Search Report and Written Opinion dated Mar. 1, 2018 issued in International Application No. PCT/NO2017/050198.
(Continued)

*Primary Examiner* — Gregory A Wilson
(74) *Attorney, Agent, or Firm* — ArentFox Schiff LLP

(57) ABSTRACT

The present invention relates to devices and systems for collecting and storage of solar energy, wherein the system for storing and retrieving captured temperature based energy comprising: one or more thermal collectors (5, 60), an energy carrier (29), a piping system (3, 7, 34, 35, 36), pumping device for controlling the flow of the energy carrier (29), and one or more ground thermal storage systems (30).

18 Claims, 12 Drawing Sheets

(51) Int. Cl.
*F24S 20/67* (2018.01)
*F24S 80/65* (2018.01)
*F24S 10/50* (2018.01)
*F28D 20/00* (2006.01)

(56) References Cited

U.S. PATENT DOCUMENTS

| | | | | |
|---|---|---|---|---|
| 7,121,342 | B2* | 10/2006 | Vinegar | E21B 36/04 |
| | | | | 166/57 |
| 8,281,861 | B2* | 10/2012 | Nguyen | H01C 3/00 |
| | | | | 166/57 |
| 8,776,867 | B2* | 7/2014 | Stojanowski | F24T 10/15 |
| | | | | 165/45 |
| 10,690,382 | B2* | 6/2020 | Nguyen | F28F 21/062 |
| 10,767,903 | B2* | 9/2020 | Broder | F24T 10/30 |
| 11,085,670 | B2* | 8/2021 | Reitsma | F24T 10/15 |
| 2005/0061472 | A1* | 3/2005 | Guynn | F24T 10/15 |
| | | | | 165/104.11 |
| 2008/0230205 | A1* | 9/2008 | Seguin | F28D 20/0052 |
| | | | | 165/45 |
| 2012/0175077 | A1* | 7/2012 | Lehmann | F24T 10/17 |
| | | | | 165/45 |
| 2015/0007960 | A1 | 1/2015 | Kawano | |

FOREIGN PATENT DOCUMENTS

| | | |
|---|---|---|
| NO | 343262 B1 | 1/2019 |
| WO | WO 2006/136860 A1 | 12/2006 |
| WO | WO 2007/097701 A1 | 8/2007 |
| WO | WO 2009/102289 A2 | 8/2009 |

OTHER PUBLICATIONS

Norwegian Office Action dated Feb. 21, 2017 issued in Norwegian Application No. 20161218.
Partial International Search Report dated Jan. 26, 2018 issued in International Application No. PCT/NO2017/050198.
Intention to Grant dated Oct. 21, 2022 in the corresponding EP application 17 831 415.9.

* cited by examiner

SYSTEM FOR STORING AND RETRIEVING THERMAL ENERGY

CROSS-REFERENCE TO RELATED APPLICATIONS

This application is a 35 U.S.C. § 371 National Phase of PCT Application No. PCT/NO2017/050198 filed Jul. 21, 2017, which claims priority to Norwegian Application No. NO 20161218 filed on Jul. 22, 2016. The disclosures of these prior applications are hereby incorporated by reference herein.

BACKGROUND

The present invention relates to devices and systems for collecting and storage of solar energy. Solar thermal collectors are normally classified as low, medium, or high-temperature collectors. Low-temperature collectors are flat plates generally used to heat swimming pools. Medium-temperature collectors are also usually flat plate which are used for heating water or air for residential and commercial use. High-temperature collectors concentrate sunlight using mirrors or lenses and are generally used for fulfilling heat requirements up to 300° C./20 bar pressure in industries, and for electric power production.

Seasonal thermal energy storage (or STES) is storing of heat or cold for periods of up to several months. The thermal energy can be collected whenever available and be used whenever needed, such as in the opposing season. For example, heat from solar collectors or waste heat from air conditioning equipment can be collected during "hot" months, for space heating use when needed, the winter season included. Waste heat from industrial process can similarly be stored and be used much later. STES stores can serve district heating systems, as well as single buildings or complexes. Among seasonal storages used for heating, the design peak annual temperatures generally are in the range of 70 to 80° C., and the temperature difference occurring in the storage over the course of a year can be several tens of degrees. Some systems use a heat pump to help charge and discharge the storage during parts or all of the cycle. For cooling applications, often only circulation pumps are used.

Examples of district heating include Drake Landing Solar Community where ground storage provide 97% of yearly consumption without heat pumps, and Danish pond storage with boosting. The Drake Landing Solar Community is a planned community in Okotoks, Alberta, Canada, equipped with a central solar heating system and other energy efficient technology. This heating system is the first of its kind in North America, although much larger systems have been built in northern Europe. The 52 homes in the community are heated with a solar district heating system that is charged with heat caught by solar collectors on the garage roofs and is enabled for year-round heating by underground seasonal thermal energy storage (STES).

The system was designed to model a way of addressing global warming and the burning of fossil fuels. The solar energy is captured by 800 solar thermal collectors located on the roofs of all 52 houses. It is billed as the first solar powered subdivision in North America, although its electricity and transportation needs are provided by conventional sources. LNG is used to cover peak heating demands.

In 2012 the installation achieved a world record solar fraction of 97%; that is, providing that amount of the community's heating requirements with solar energy over a one-year time span.

The Borehole Thermal Energy System (BTES) is located underground to store large quantities of heat collected during the summer to be used in the winter. It consists of 144 boreholes, which stretch to a depth of 37 m (121 ft). At the surface the pipes are joined together in groups of six to connect to the Energy Centre. The entire BTES is covered by a layer of insulation, on top of which the park is built. When the heated water is to be stored, it is pumped through the pipe series. The heat is then transferred to the surrounding soil as the water cools and returns to the Energy Centre. When the homes need heat, water flows to the center of the BTES field and picks up the heat from the surrounding soil. The heated water then goes to the short-term energy tank in the Energy Centre and is pumped through the District Heating Loop to the homes.

There are several shortcomings in the present technology related to BTES and STES. One technical problem is that there are considerable requirements to equipment needed in the processing phase when adapting the energy to specific needs of the user community. The requirements for advanced processing facilities means that there are limited benefits for a smaller community or single household other than when being part of a network connected to the network and/or the heat requirements are solely for house temperature control.

Another technical problem with current systems is that they provide heating only. As seen in the use of heat pumps is that instead of being a source for energy savings, they are in the hot months of the year used as coolers, and the end result is that a house equipped with heat pumps uses more energy for heating/cooling than a house relying on traditional heating systems such as electrical heaters. It is thus a problem with present available BTES and STES that they can supply heating but not cooling.

Chlorofluorocarbon, CFC, was for a long time the compound used as refrigerant in applications needing cooling, such as in refrigerators. EU agreed to ban production of CFC by the end of the century (2000). Alternative compounds have been developed, but there is a continuous struggle to develop new chemical compounds for replacing the CFC as refrigerants. Hydrofluorocarbons has taken over much of the ozone damaging CFCs compounds, but these again are believed to have a certain global warming potential, and are likely to be regulated or even banned in future.

It is further a technical problem that the solar thermal collectors are expensive, often based on a reflector or covering plate to reduce energy losses caused by wind, and piping system for maximizing the heat transferred to an array of piping leading to and from a heat storage. A problem is that they are only adapted to process the heating effect of the sun. The installations are vulnerable to the effect of snow and ice, and expensive to maintain and repair.

It is also a problem in current product offerings of solar thermal collectors that they are less effective than desired, since much of the potential heat collecting is lost due to the direct exposure to weather and wind.

A problem with thermal collectors are that a lot of harvesting hours are lost because of the equipment is covered by snow or frost.

SUMMARY

The present invention is directed to a system for BTES, which will solve one or more of the above stated technical problems.

The present invention relates to a device, method and system for providing a flexible thermal collecting, and storage and retrieval, being adaptable for individual needs by a user, household, or community.

In one aspect the invention relates to providing a flexible 3 dimensional thermal storage and retrieval system, providing flexible configurations and operations.

In another aspect, the invention relates to a configurable BTES for use both in cold and warm months providing both heating and cooling for individual user requirements. Thus in this way eliminating the need for chloroalkanes, halocarbons and other refrigerants for refrigeration and air conditioning.

In a further aspect, the invention relates to a device for thermal collecting, optimized for being arranged on the roof of a house, but not limited for such arrangement. The thermal collecting will for the present invention in an alternative embodiment mean the cooling of a medium and storage of a cooling resource.

A further aspect of the invention relates to a device for thermal collecting comprising an expandable insulation layer offering both insulation and in a further embodiment also a tool for aiding the removal of snow and ice.

In a further aspect of the invention, any feature of the foregoing aspects may be combined for additional advantage.

Although the examples below describe scenarios where the collectors are arranged outside, collecting heat and cold energy from the air/sun, it should be understood that the invention may well be used in any environments offering a warm and/or cold environment, for example inside an industry production hall for collecting heat, or for example a space inside a glazier for collecting cold.

The invention is defined by the attached independent claims, and further advantageous embodiments are defined by the corresponding dependent claims.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION

The present invention relates in various aspects to a device, systems and methods for collecting, storing and retrieving captured temperature based energy.

When the term energy carrier is used it shall encompass at least: water, water with anti-freeze compounds, any cooling fluid, or any fluid used for transporting the collected heat/cold from the thermal collector.

When the term thermal collector is used it shall be understood to encompass at least the thermal collector/pressurized fluid mattress of the invention. It shall in its widest context also comprise other known type of solar thermal collector, flat plate and evacuated/vacuum tube collectors, when used in combination with the ground thermal storage system forming part of the present invention.

When the term ground thermal storage system is used it shall be understood to encompass the borehole system described herein, also comprising the equipment on the surface on the ground and underground necessary to complete the fluid circulation to and from the above ground installations, with its piping, connections and borehole installation. It shall in its widest context also comprise other known BTES is used in combination with the thermal collector forming part of the present invention.

In a first embodiment of the invention, a system for storing heat energy underground is provided. The system is adapted to the need of the user/household, and is designed to provide close to 100% of required heat energy required, even for installations in tempered and cold climate zones having winter temperatures below zero, and which prohibit the heat collecting to be disabled during day, week and even months at a time. As described in FIGS. 2, 3 and 4A-B, a layout of a borehole design is provided where a plurality of low diameter boreholes have been drilled, and each borehole accommodates an assembly of sleeve, pipes and devices for optimal charging and extraction of heat by an energy carrier.

The system is further comprising a thermal collector device in the form of an energy carrier filled mattress, the mattress being mountable for example on a rooftop, or on the ground, preferably in a slanted area.

A flow controlling module 4 and a piping system provides controlling and transfer of the energy carrier 29 between the thermal collector devices of the system and the ground thermal storage system 30 with its boreholes. The flow controlling module 4 may further be comprising processing resources and/or communication devices for communicating characteristics, performance data, and controller commands to and from the flow controlling module 4. It may also be provided a remote controlling system for controlling and maintenance of the system, such that the operation can be run from a remote computer, computer system or communication device such as for example a smart phone app.

Figure 1:
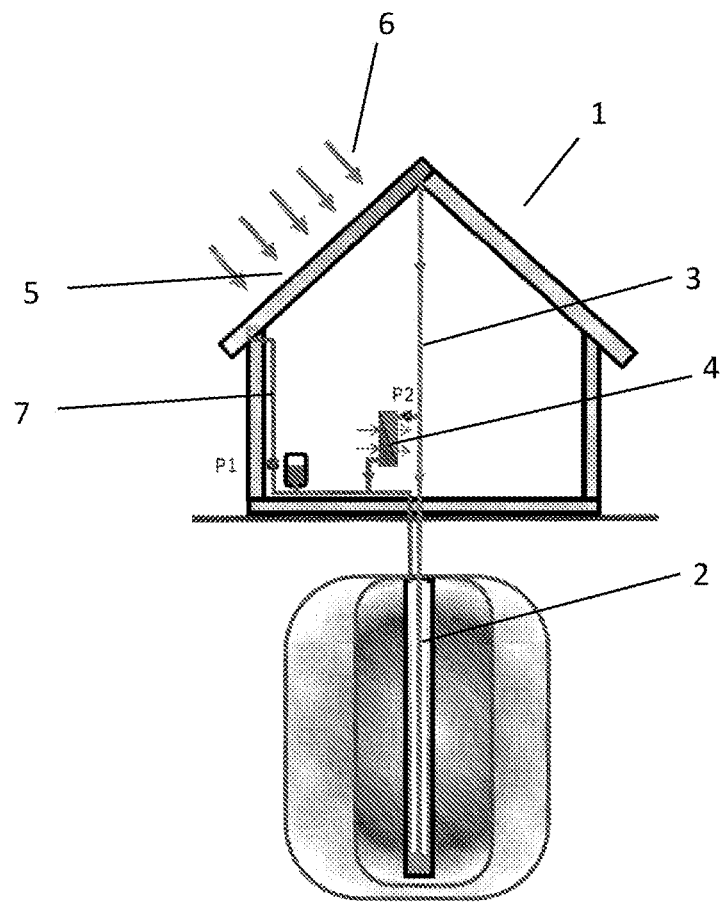
FIG. 1 shows a conceptual overview of the solar thermal collecting and storage
Figure 2:
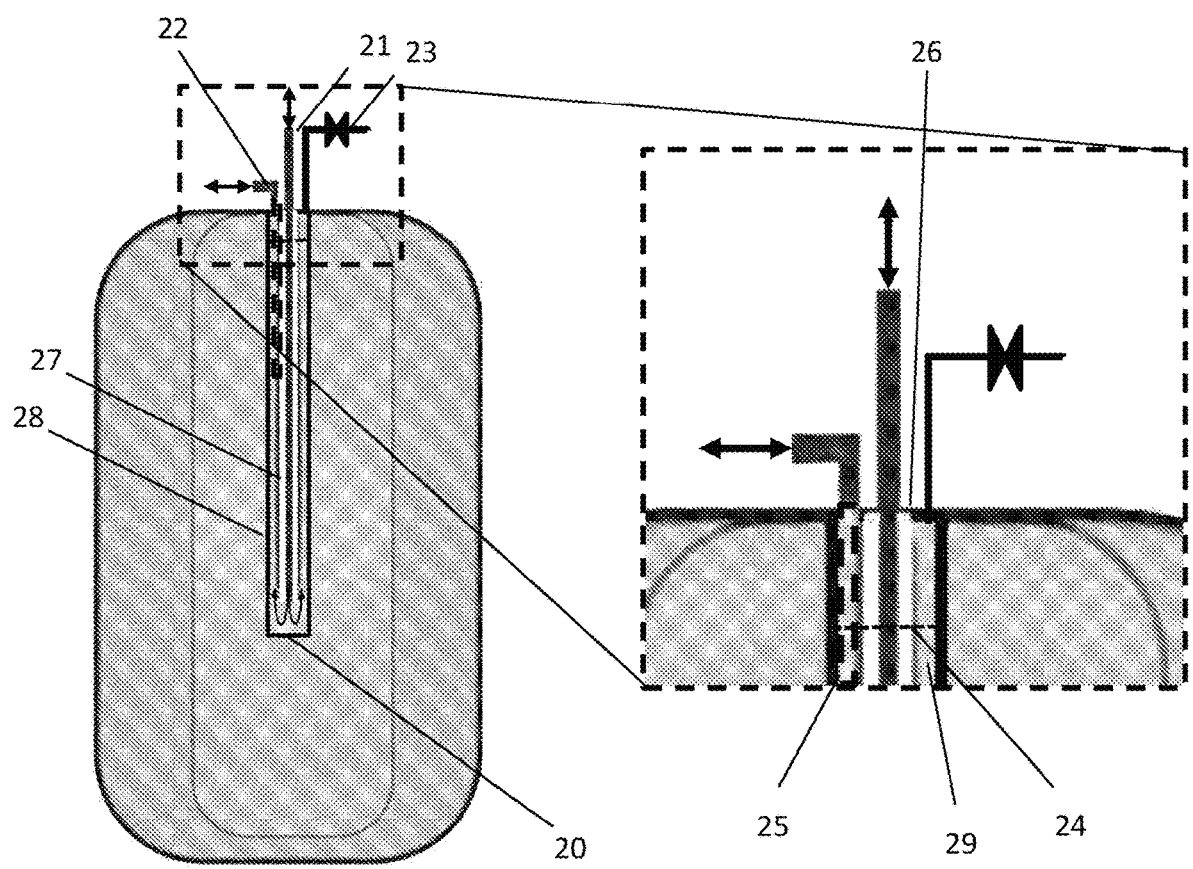
FIG. 2 show a borehole and a section of an alternative top assembly
Figure 3:
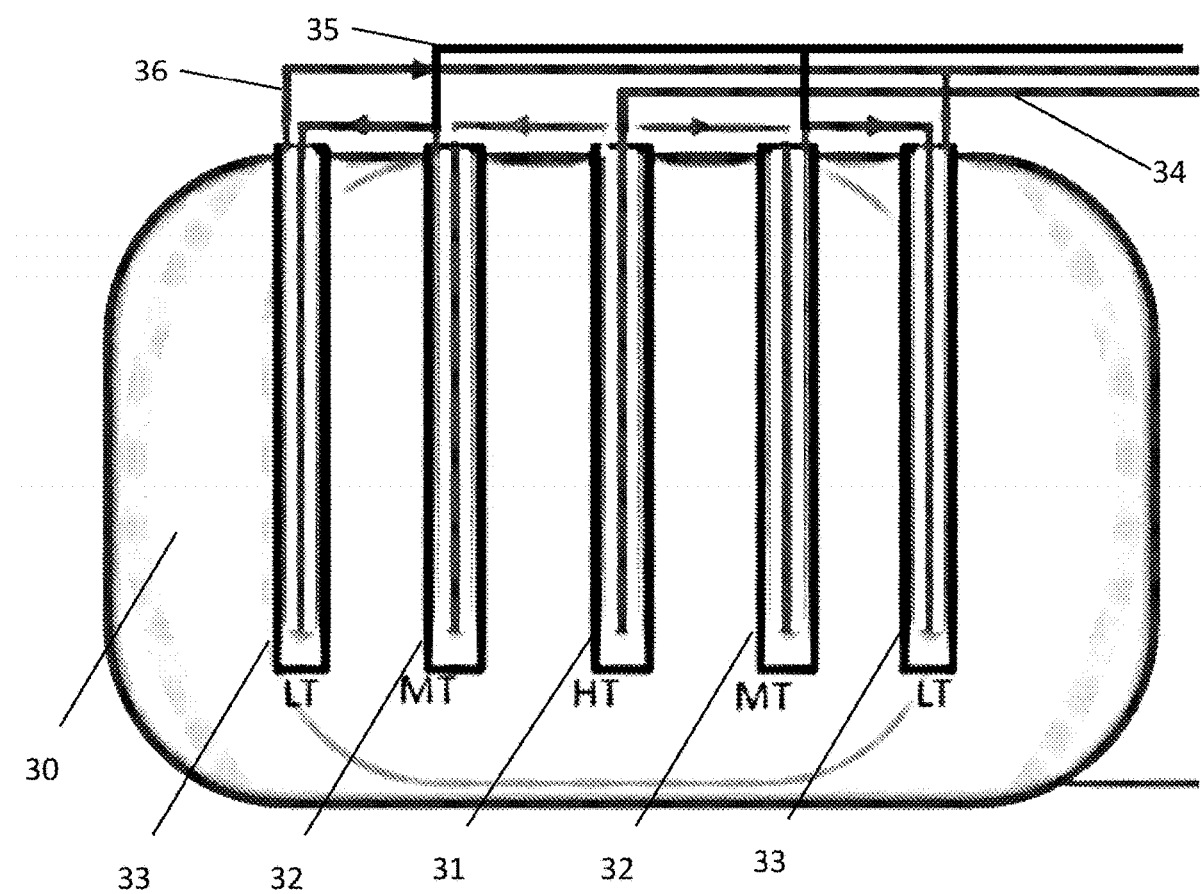
FIG. 3 show a side view of a ground thermal storage system comprising a multitude of boreholes FIG. 4A show a top view of a ground thermal storage system comprising a multitude of boreholes FIG. 4B show a top view of a ground thermal storage system comprising a multitude of boreholes and a corresponding heat graph FIG. 5 show a double temperature graph view of a double ground thermal storage system comprising indicating temperature characteristics FIG. 6A Principle flow diagram of a pressurized fluid mattress
Figure 4A:
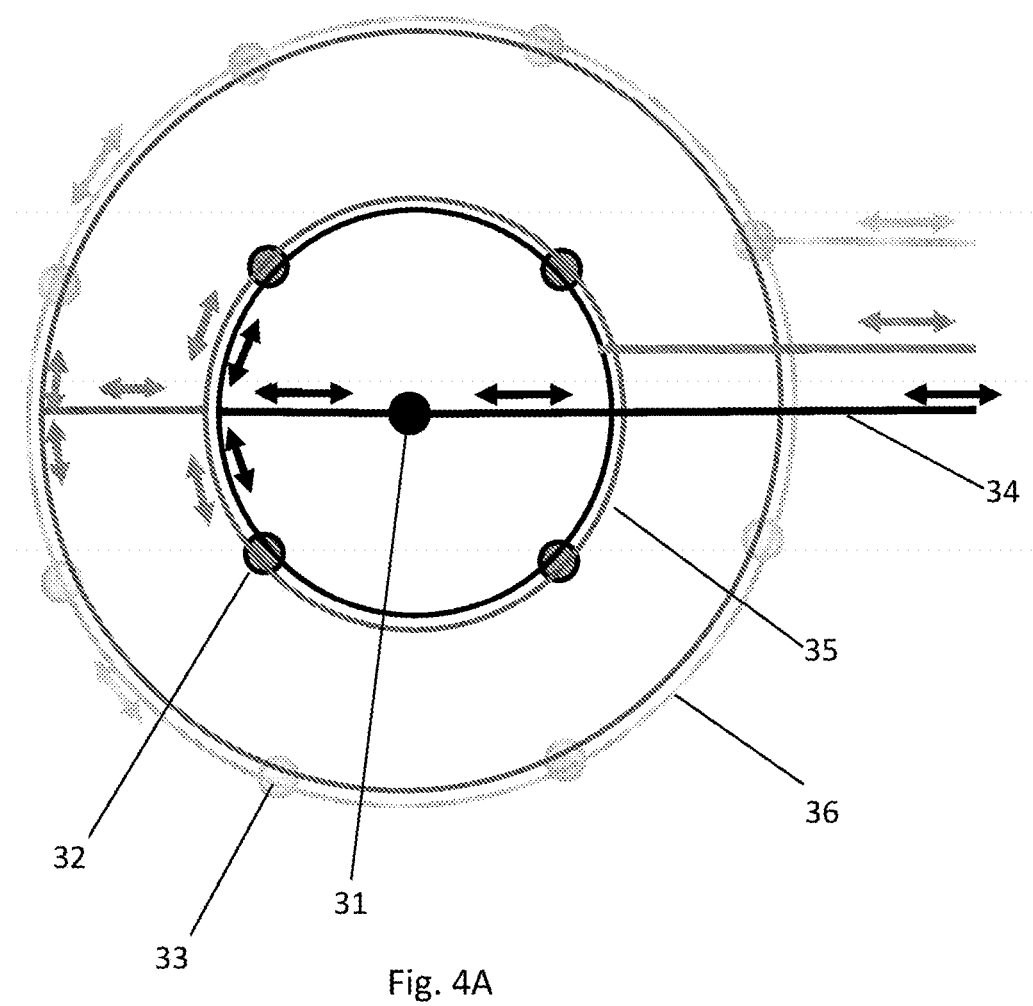
Figure 4B:
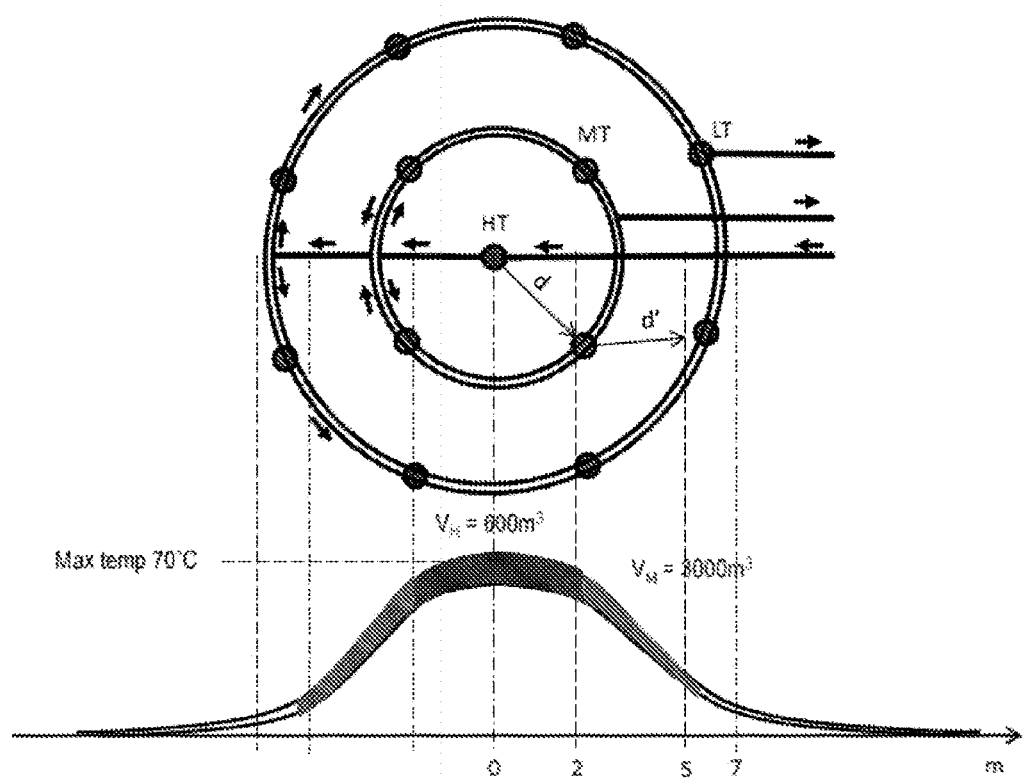

Details of the borehole design will now be discussed with reference to one example design of the invention as shown in FIG. 2. The system is in one embodiment filled with plain water 29 without any additives, and is further comprised of a solar collector installation, a piping system and a flow controlling module, and a number of boreholes grouped in a number of heat sectors, the boreholes being equipped with the sleeve pipe concept of the invention, and the water 29 is circulated in the solar collector installation, the piping and the borehole groups.

The boreholes will be predrilled, preferably equispaced to each other. The boreholes will advantageously be drilled in the bedrock, but could also be arranged in soil and/or sediments where the invention will offer a more secure heat retrieval phase than corresponding heat pumps can do. A traditional heat pump will, when fetching heat from a reservoir return energy carrier at very low temperature, and there is a risk for freeze drying the storage medium if the storage medium is the soil and/or sediment. The present invention offers a retour temperature of the water 29 of at least several degrees above 0° C., and hence no risk of freezing any part of the underground is present.

The boreholes are further characterized by the ability to use much lower diameter than traditional bedrock heat storages. The boreholes typically, will have a diameter of Ø65-90 millimeter compared to a typical diameter of 115 millimeter, and each borehole is drilled to about 25-50 m, even 70 when requested. The life cycle assessment (LCA) aspects represents considerably less impact on environment, due to much less spoils in production phase, less machinery necessary to drive the drilling equipment, and the possibility to use only top hammer drilling equipment. Additionally, the invention makes it possible to use only light weight endurable materials with low contamination effect on the environment. High endurable plastic materials are used in sleeves, pipes, coupling and the like. In each borehole a sleeve is installed. The sleeve comprises a sealed bottom 20 and is produced of a flexible endurable temperature resistant material. A Feeding pipe is installed in the sleeve in the borehole, where the feeding pipe is preferably made of a light material, such as plastic.

To avoid leakage of energy in the storage medium a pipe-in-pipe (PIP) technique is chosen to transport water 29 to and from desired depth in each borehole/sleeve. The PIP solution presented by the present invention is devised by using a distinctly smaller first outside diameter pipe inside a pipe with a larger second inside diameter, and air tight coupling at the peripheral ends of the interacting length of the two. This way there is a defined air pocket surrounding the inner pipe, increasing considerably the insulation between the water in the borehole+sleeve and the water 29 inside the inner pipe.

Each borehole comprises an inflow and outflow coupling. Each inflow coupling is connected via piping to either the outflow coupling of the neighbor borehole of higher temperature specification, or the inflow coupling of the highest temperature borehole being connected via piping to the flow controlling module and/or the outflow coupling of the sun collector installation.

Each outflow coupling is connected via piping to either the inflow coupling of the neighbor borehole of lower temperature specification, or the outflow coupling of the lowest temperature borehole being connected via piping to the flow controlling module and/or the inflow coupling of the sun collector installation.

The boreholes may be arranged in groups having similar temperature characteristics and having a group inflow and outflow coupling.

Additionally, may all or some of the borehole group couplings, both inflow and outflow, be provided a secondary piping system to be in water flow communication directly to the water flow controlling module.

The borehole sleeve comprises a top lid 26 and is initially pressurized in order to "fill" the borehole and provide a good contact to the borehole wall and bottom 20. Pressurization may be in the order of 1-2 bar and controlled by putting pressure of air/gas to a control valve 23 provided in the top lid 26. When installed, the sleeve will function as a heat exchange medium from the bottom to the top of the borehole. The filling pipe may advantageously be installed into the sleeve under production of the borehole (installation of the sleeve). The filling pipe may typically have a diameter of approximately Ø 8-10 mm.

The pressure in the pipe may also be used to arrange the top level of the water column in each borehole/sleeve once in production. The control of the pressure and water level inside is facilitated by an air tight top 26 of the borehole 28, and a pressure valve 23 which may be manipulated to adapt the ground thermal storage system 30 to available heat resources and water flow. This will effectively act as insulation, as all energy exchange stop when no liquid is present. By alternating the liquid level within in the BTES, top layer insulation may be avoided.

When the total BTES capacity and characteristics are defined, this will decide at which level a pipe in pipe connected to the inflow shall reach into the borehole, and equally for the level a pipe in pipe connected to the outflow shall reach into the borehole. Typically, the inflow pipe 27 will reach well below the midpoint down the borehole, and the outflow pipe 25 will reach a safety distance below the surface of the water column in the borehole. The outflow pipe 25 may in one embodiment be adjustable to any set level of water in the borehole 28.

Initially the boreholes comprised in the total ground thermal storage system 30 are filled with water, as well as is the piping and solar collector installation.

The borehole groups in the ground thermal storage system 30 is arranged in temperature groups, wherein the center of the ground thermal storage system 30 comprise the highest temperature boreholes, and the temperature characteristics of the radially arranged borehole groups is arranged after descending temperatures.

The flow controlling module 4 will measure the temperature of the water output 3 from the sun collector 5 and route the warmed water to the borehole group of the matching temperature characteristics. The flow controlling module 4 comprise flow speed controller pump (not shown) able to effectuate required circulation of water through the piping system, the solar collector 5, and the boreholes 28.

When the water is transferred from the solar collector after being warmed by the sun or high environment temperature to the inflow pipe 27 and released below midpoint of the borehole 28, the water will release and heat up the ground near the borehole walls, the temperature transferred through the contact medium of the sleeve being filled with the water and being in physical contact with the borehole wall. The high temperature of the water and the continued feeding of water will make sure the water is transported to the outflow pipe 25 opening of the borehole 28 closer to the surface of the water 24 in the borehole 28. The water will from the outflow coupling 22 of the borehole 28 be fed into the inflow coupling 21 of the borehole 28 in the downstream direction of the borehole 28 having stored some of the heat energy in the water flow in the ground/soil/mountain around the borehole walls. If the outflow coupling 22 is the one on the lowest temperature borehole 28, the water is led back to the controlling module and to the solar collector 5 for being rewarmed.

The flow controlling module 4 may get input from water from any outflow coupling being set up for direct water communications with the controlling module.

The flow controlling module 4 may input from water to any inflow coupling being set up for direct water communication with the controlling module.

This means that the system will store any water output from the solar collector 5 at any given time independent of the temperature from the solar collector 5 as long as the output temperature from the collector 5 is higher than the lowest temperature borehole 28 being able to be in direct communication with the flow controlling module 4. The flow controlling module 4 will measure the temperature and direct the water flow to the borehole with corresponding water temperature range.

In a further embodiment of the invention, the flow controlling module 4 may direct/extract water from any of the boreholes 28 being able to be in direct water communication with the flow controlling module 4 for various purposes of use. This means that water for house heating will be fetched from a high temperature borehole, whilst water for showering may be harvested from a different borehole. Water drawn from the system for spending (washing, watering etc.) will need to be replenished simultaneously as the water is harvested from the system.

Harvesting water from the ground thermal storage system 30 may well be for the purpose of cooling a house, e.g.: the borehole temperature of the warmest section 31 of the ground thermal storage system 30 is 55° C., and at the peripheral outer boreholes in the coldest section 33 the temperature is close to the natural rock ground temperature, 5-15° C., then for the purpose of cooling a room in the house the flow controlling module 4 may fetch water from the outer boreholes 28 in the low temperature zone 33 and feed this water to a cooling device able to reduce the temperature in the required room. When the water is spent in the cooling producing device, it will have a higher temperature than it had at the extraction, and the flow controlling module 4 may feed the water back to a borehole with a higher temperature.

The ground thermal storage system 30 may be comprised of a multitude of different temperature sectors, wherein the boreholes are typically arranged in radially expanding circles, the inner circle having the highest temperature, and the temperature is lower the farther out from the circle center a borehole is arranged.

Figure 6A:
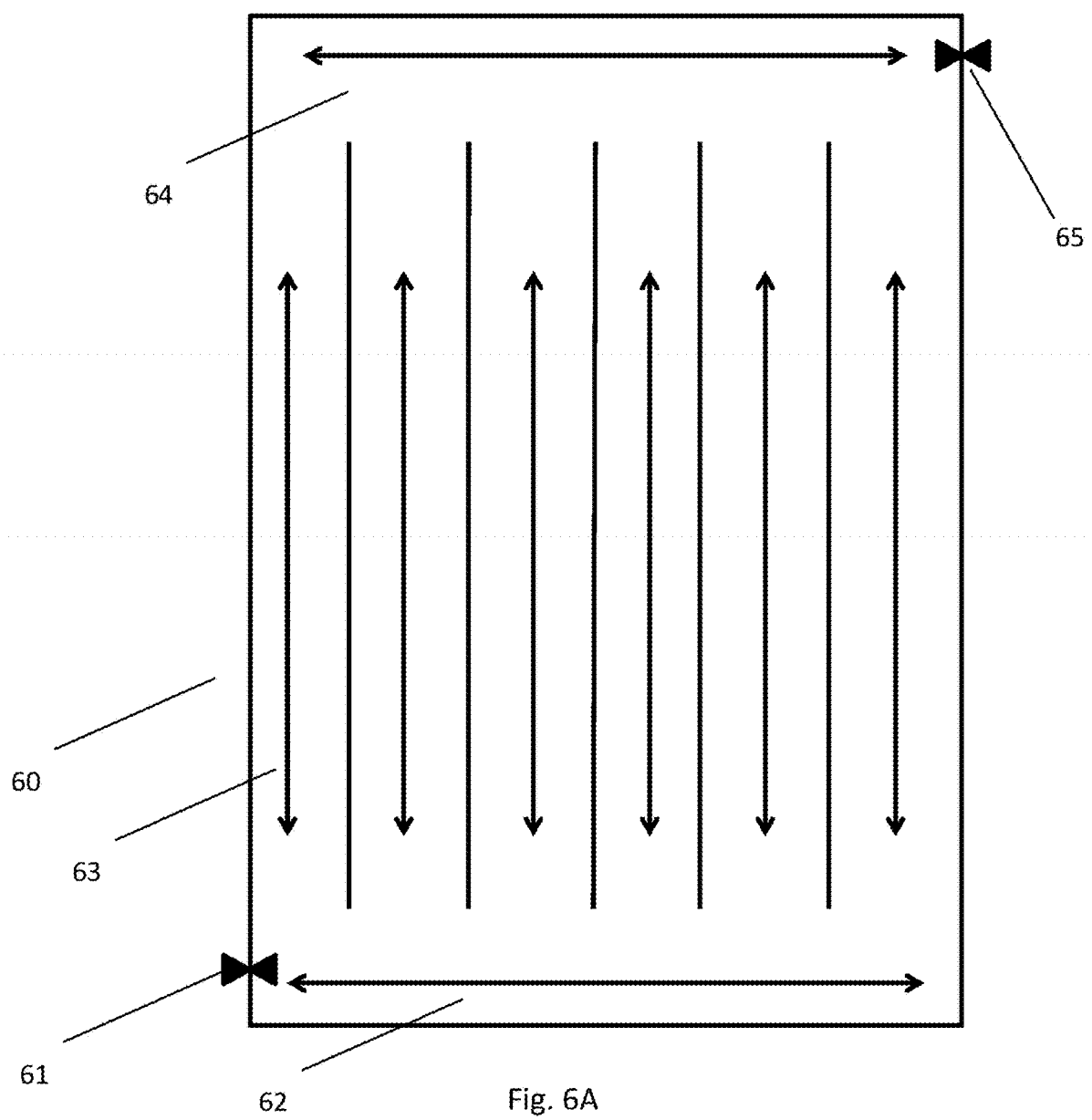
FIGS. 6B and 6C show a side and oblique view of the canal layout of a pressurized fluid mattress FIG. 7A show a pressurized fluid mattress arranged on a roof FIG. 7B show a pressurized fluid mattress in a single cell version arranged on a roof FIG. 7C show a pressurized fluid mattress in a double cell version arranged on a roof FIG. 8A show a pressurized fluid mattress comprising a gas filled isolation layer FIG. 8B show a pressurized fluid mattress comprising a gas filled isolation layer having several sections.
Figure 6B:
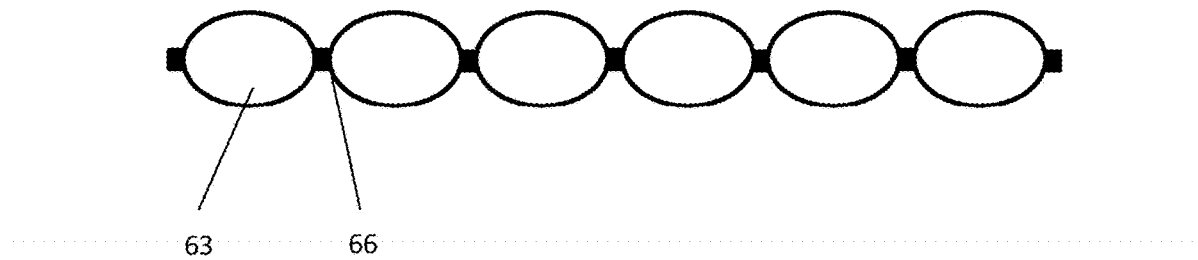
Figure 6C:
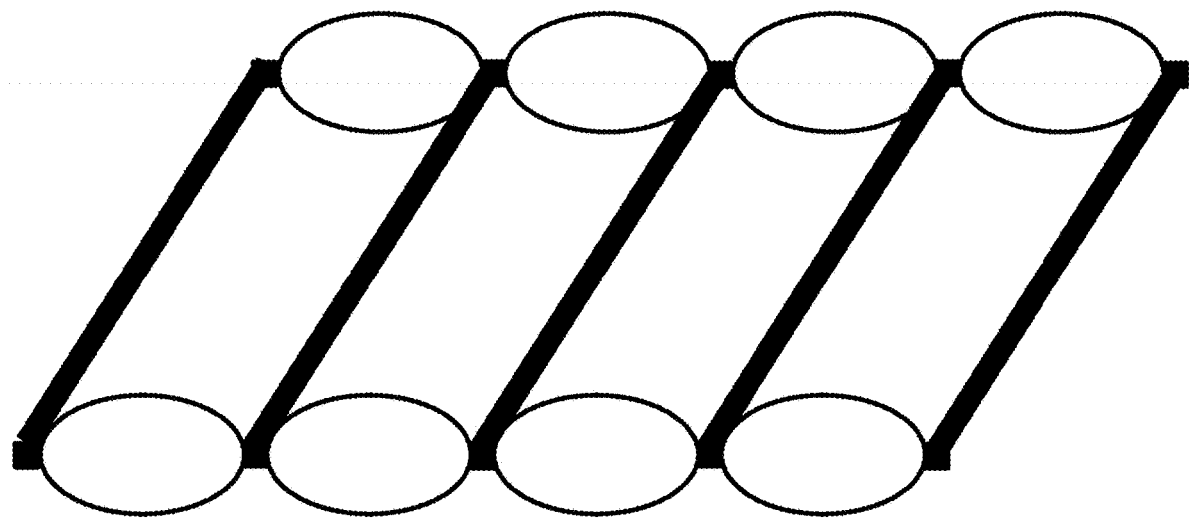

The solar collector installation is typically arranged on an angled house roof facing south, for maximum exposure to sunbeams as shown in FIGS. 6 A-C, 7 A-C and 8 A-B. The solar collector 5 is comprised of a fluid filled mattress 60, which is pressurized by water being heated up by the sunrays 6, the water circulation is improved by the direction of heat transfer by conductions from an input valve 61 through a first manifold section 62 leading the water to the inflow side of a number of separated canals 63, and into a second manifold section 64 before it is fed through an output valve 65. The individual canals 63 are separated by a connecting wall section 66, wherein the connecting wall section may be formed of the same material as in the canals 63. It is advantageous that the material is a flexible light polymer material of a dark hue, with temperature properties varying from −50 to 125° C. The water to the input valve 61 is fed from the flow controlling module 4 pumping water through a feed pipe 7 and into the input valve 61, whereupon the water will flow through the solar collector and out through the output valve 65. The output valve 65 is coupled to the outflow pipe 3 being in connection with the ground thermal storage system 30 via the flow controlling module 4. The flow controlling module 4 comprise flow speed controller pump (not shown) able to effectuate required circulation of water through the piping system, the solar collector 5, and the boreholes 28.

The solar collector may comprise a backflow feature, being executed when the flow is too low compared to power being collected from the environment, then it may be necessary to drain the fluid filled mattress 60 to avoid boiling. The solar collector may even execute the backflow feature when temperatures are close to or below freezing point and the water in the solar collector 5 may be at risk of freezing.

Figure 7A:
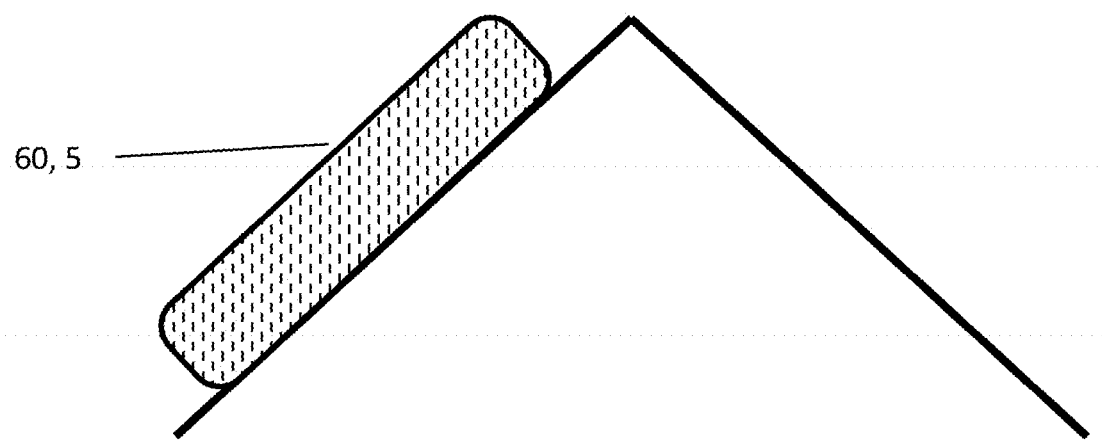
Figure 7B:
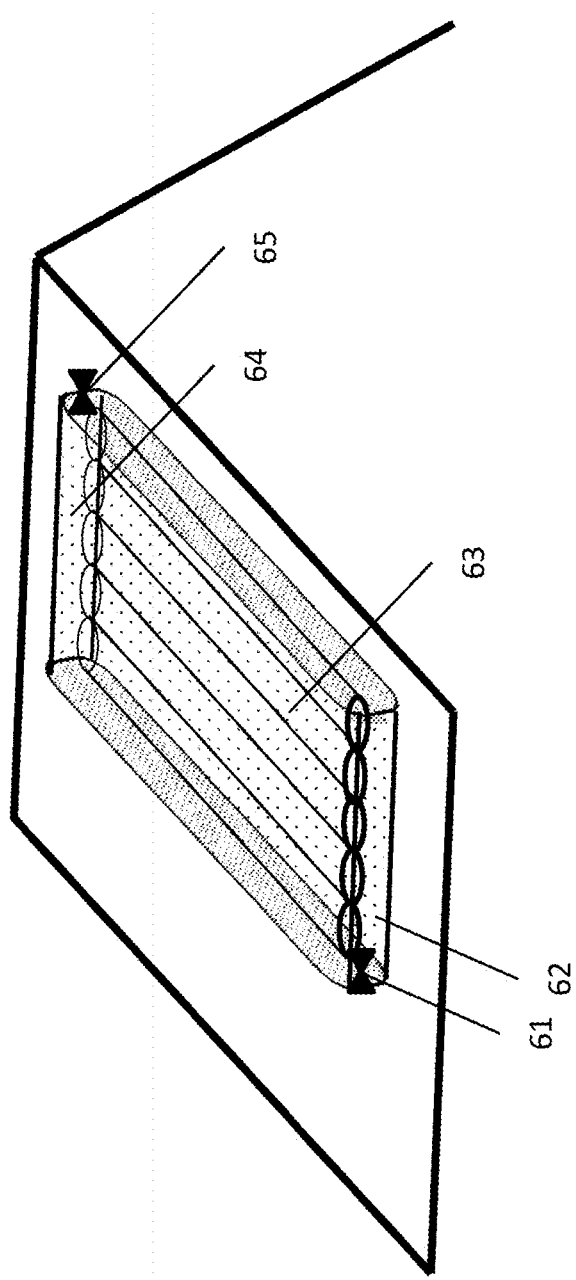
Figure 7C:
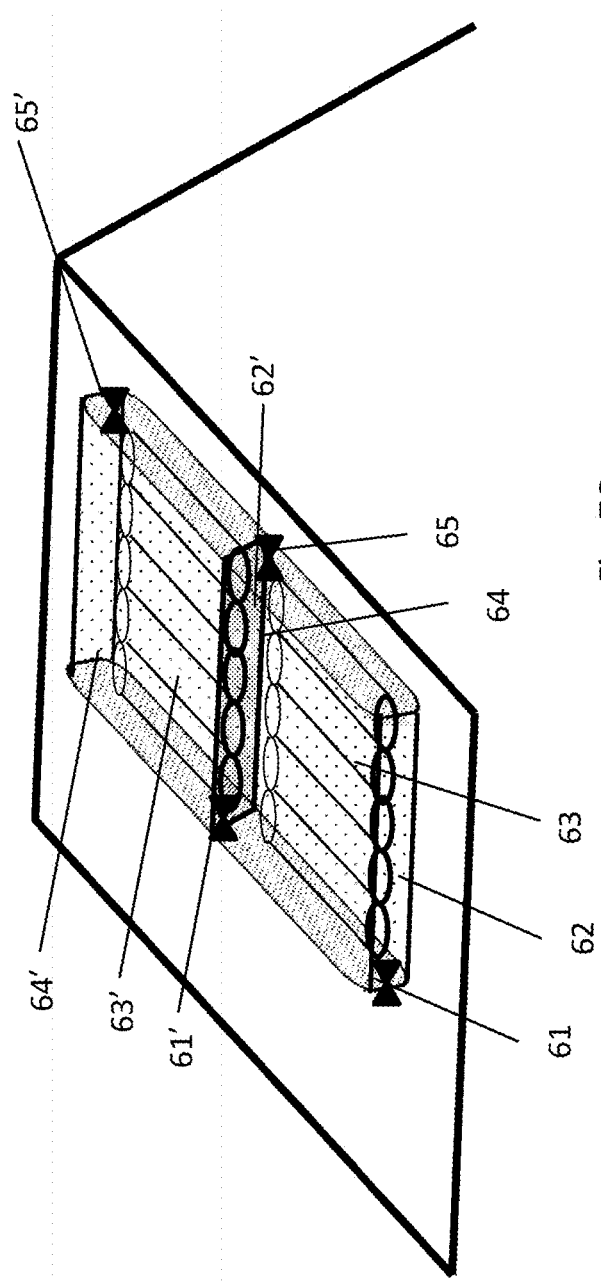

The solar collector 5 is pressurized with water flowing from the inflow valve 61 to the outflow valve 65, and the mattress 60 may provide two or more circulation circuits, for example where one circulation circuit 61, 62, 63, 64, 65 is comprised in a first lower part of the mattress 60, and a second circulation circuit 61', 62', 63', 64', 65' is comprised in a second higher part of the mattress as exemplified in FIG. 7C. The option to split the mattress in more than one circulation circuit is provided so that pressure forces inside the mattress can be held at an acceptable low level to keep the requirements to flow controller devices, and material in mattresses, piping and valves at a level to be able to avoid heavy, power consuming and expensive equipment.

Now another aspect of the invention will be discussed, the ability to use the underground as a cold storage. Every year vast amounts of energy are used to cool buildings and equipment, and the energy spending is a substantial contributor to pollution and world-wide rising climate problems.

The invention may provide a low power consuming alternative to provide seasonal cooling for various purposes such as cooling of building and equipment throughout the warm seasons. The requirement is that there are periods of cold weather, such as cold winter days, and/or low night temperatures. The invention's ability to store cold in the underground is dependent on the amount of cold climate available for the collectors.

When using the present invention as a cold storage, the same equipment as for heat storage is used, and the same method of using boreholes may be used. It is however necessary to provide a separate ground thermal storage system 30 for the cold storage.

When the invention is used as a cold storage and temperature surroundings of the thermal collector device is below the freezing point of water, it is necessary to substitute the water with an anti-freeze cooling fluid. The fluid may be water which is mixed with anti-freeze components.

Another limitation to the system when used with a cooling fluid which is not clean water is that the system cannot provide cooled water directly for human consumption.

When the invention is used as a cold storage the flow of cooling fluid is reversed through the borehole in the manner that the outflow pipe 27 now is the pipe arranged with its opening at the lowest point in the borehole 28, and the inflow pipe opening 25 is arranged close to the surface 24 of the cooling medium filling the borehole. When the cooling medium flows from the inflow pipe 25 to the outflow pipe the flow is achieved by the direction of heat transfer by conduction and the flow controller pump 4 connected to the ground thermal storage system 30 by the piping.

When the cooling fluid is transferred from the thermal collector 60 after being cooled by the to the inflow pipe 25 and released close to the surface of the cooling fluid 24 in the borehole 28, the cooling fluid will release and cool the ground near the borehole walls, the temperature transferred through the contact medium of the sleeve being filled with the cooling fluid and being in physical contact with the borehole wall. The low temperature of the cooling fluid and the continued feeding of cooling fluid will make sure the cooling fluid is transported to the outflow pipe 27 below midpoint of the borehole 28. The cooling fluid will from the outflow coupling 21 of the borehole 28 be fed into the inflow coupling 22 of the borehole 28 in the downstream direction of the borehole 28 having stored some of the cold energy of the cooling fluid flow in the ground/soil/mountain around the borehole walls. If the outflow coupling 21 is the one on the highest temperature borehole 28, the cooling fluid is led back to the controlling module and to the thermal collector 60 for being cooled down again.

Typical temperatures for a cold storage according to the invention can be the range−10° C. to 0° C. in the coldest borehole to possibly a few+degrees for the hottest borehole.

Likewise, the thermal collector will have the opposite flow direction, such that inflow valve 65 is the highest arranged valve, and the flow direction of the cooling fluid is down to the lowest arranged valve 61.

The flow controlling module 4 will be controlling the speed of cooling fluid transfer.

The borehole closest downstream of the thermal collector is going to be the borehole closest to the center of the ground thermal storage system 30 and therefore also the coldest temperature borehole. The borehole will be arranged with higher temperature characteristics the farther out from center of the ground thermal storage system 30 they are arranged.

The invention may provide both heat and cold storage in the same thermal collector-ground thermal storage system 30. Such an embodiment of the invention will be provided with a more complex piping system, and flow controller module 4. The flow controller module 4 may direct the energy carrier, for example water with anti-freeze mixed for enduring the estimated lowest temperature of the environment without freezing, to either the heat storage, if the temperature is above a lowest pre-set threshold for heat storage, or to the cold storage if the temperature is below a highest pre-set threshold for cold storage.

Figure 5:
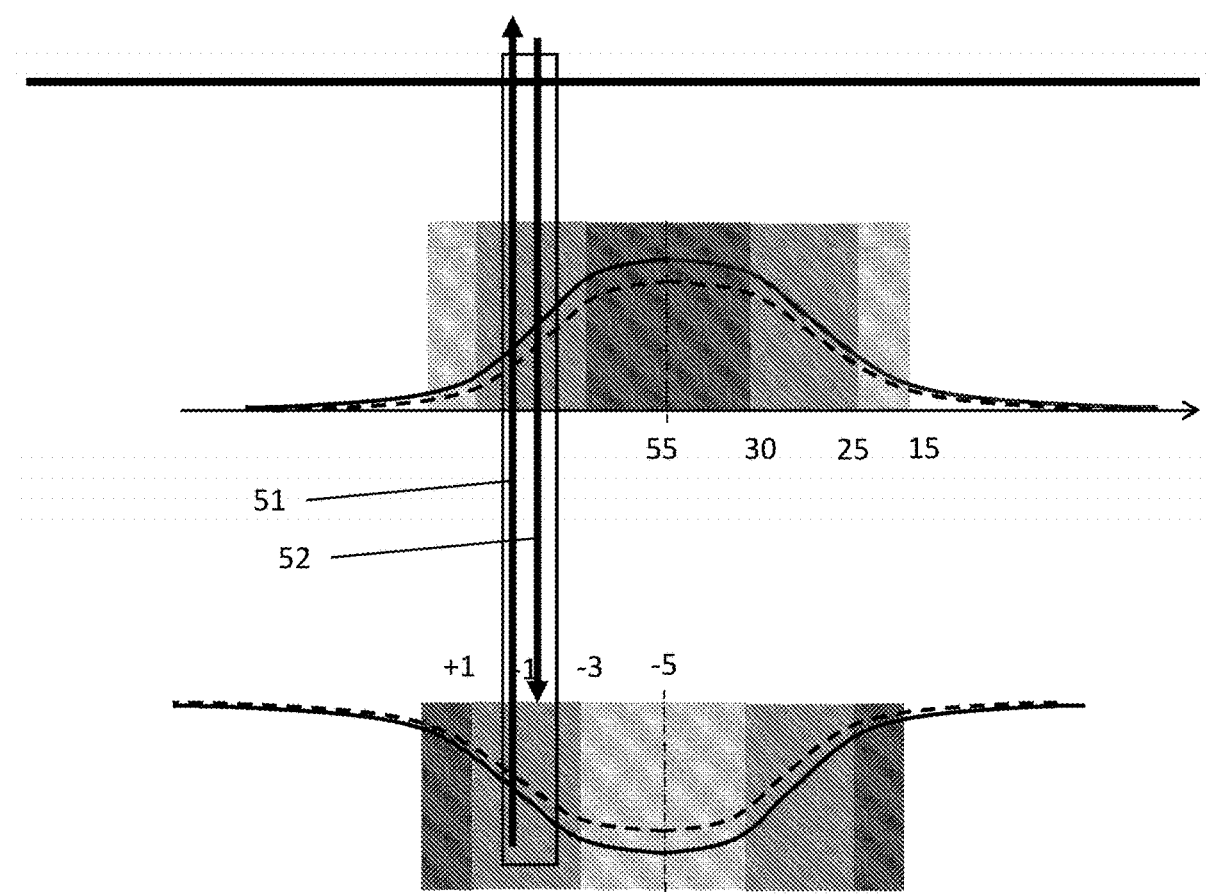

It is further provided a system for arranging the cold storage vertically directly below the heat storage. In this arrangement the requirements for ground thermal storage system area occupancy will be lower. The geographical footprint of both systems will be the same size as if there were only one of cold or heat ground thermal storage system 30. Preferably the cold storage will be arranged below the heat storage as sown in FIG. 5. The piping to and from the boreholes in the cold storage is then arranged through the boreholes of the heat storage. The piping will be of the type pipe-in-pipe discussed above in order to maximize temperature insulation capability of the pipes so the energy carrier will not be affected too much by the heat when transferred through the heat storage.

It is expected that a cold storage, with temperatures below 0° C., will reduce energy losses from the storages as the groundwater will stop flowing.

The boreholes may be established sufficiently deep for comprising both the cold and heat storage. The pipes to and from the cold storage, and the sleeves in the cold storage, are installed through the borehole prior to arranging any components in the heat storage part of the boreholes. An insulation layer is then added on top of the sleeves of the cold storage. Then the piping and sleeves of the heat storage is arranged in the boreholes. In such an embodiment the piping to and from the cold storage will be arranged through some or all of the boreholes in the heat storage and arranged between the borehole wall and the outside wall of the sleeves. It may also be provided in the sleeve bottom and lid a sealable conduit for allowing the piping to and from the cold storage to be arranged inside the sleeve, and thereby not disturbing the heat transfer between the energy carrier through the sleeve and into the surrounding ground/soil/mountain.

Isolation layer may be achieved by pressurizing the sleeves by airs/gas. The gas filled portion of the sleeve is then of a depth sufficient for avoiding the one storage to influence the other storage. If the boreholes are used for both cold and heat storage, the sleeve of the heat storage boreholes may be arranged on top of the sleeve of the cold storage, alternatively in direct contact so that the sleeve bottom of the heat storage sleeve is in direct or close vicinity of the top lid of the cold storage sleeve. In another embodiment where the cold storage is arranged under the heat storage, there may be drilled separate boreholes for the two storages. This will provide less implications of not having to arrange the piping for the cold storage through the same boreholes that comprise the sleeves for the heat storage, however there must be drilled twice as many boreholes.

Figures 8A, 8B:
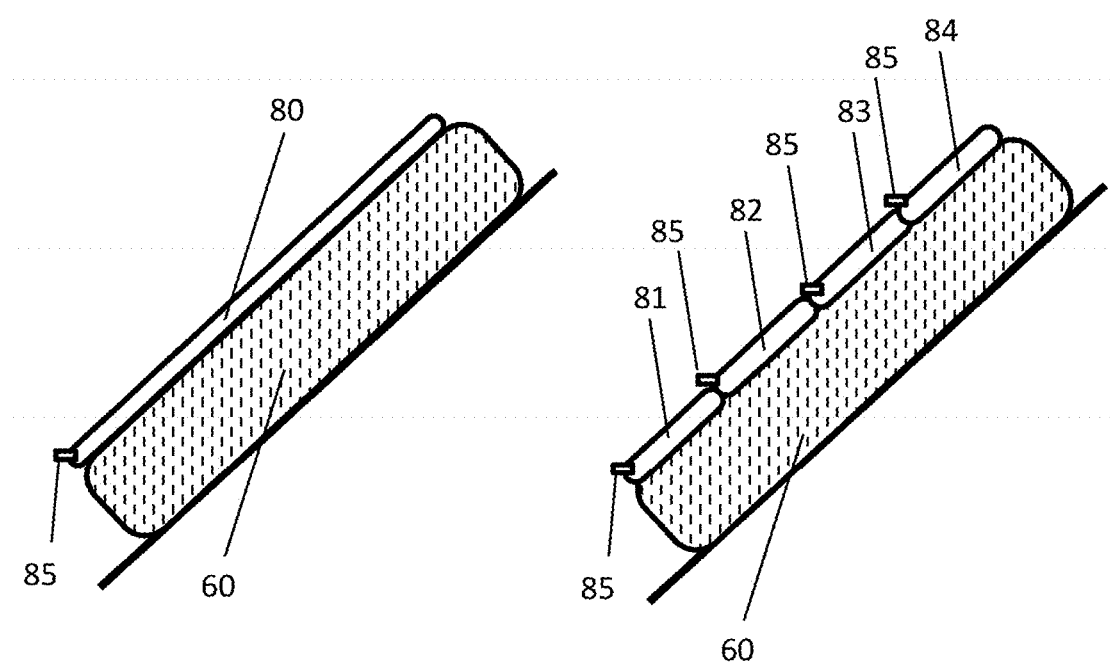

A further aspect of the invention is discussed as exemplified in FIGS. 8A and 8B. The thermal collector 60 comprises an insulation device 80 arrange at least in contact with the top surface of the thermal collector 60. The insulation device 80 is produced in a transparent material and may be inflated through a valve 85 to change the isolation characteristics of the insulation device 80. The insulation device may be used to prevent the energy carrier to freeze on cold days, or prevent undesirable cooling wind effects to cool the heat collector when the sun is shining and the thermal collector 60 is in a status where heat could be collected from the environment.

A further aspect of the invention related to the insulation device 80 is that it can be used to remove snow and frost. In one embodiment it is possible to inflate/feed the insulation device 80 with hot air/gas to melt frost that prevents the thermal collector to collect the heat from the sun beams. If snow has gathered on top of the thermal collector it is possible to increase and decrease the air/gas pressure in the inflated insulation device 80 in order for the snow to release and glide off the surface of the thermal collector.

In a further embodiment of the insulation device 81, 82, 83, 84 it is provided a cell based insulation device having individually inflatable cells for improved snow repelling effect. When snow has fallen, and is of a type which not easily glide off the surface of the thermal collector 60, it is possible to inflate and deflate the cells 81, 82, 83, 84, individually. One example is to inflate the lowest cell 81 to a maximum such that a portion of the snow will break loose or at least be more easily shuffled off the surface of the thermal collector 60. In a next operation the cell 81 is deflated and the next cell 82 above is inflated to its maximum, and the snow will break and glide off. The same process is repeated until the upper most cell 85 is inflated and snow is removed. This aspect of the invention increases the lifetime of the thermal collector 60 for installations in snow prone environments, and may increase the collecting hours for both cold storage and heat storage.

It shall be understood that the inventive concepts described herein can have multiple modifications, in the case such modifications are within the scope of the claims and their equivalents, it is intended to be comprised by this invention.

The invention shall also be recognized by the following advantageous system embodiments where there is in a first system embodiment a system for storing and retrieving captured temperature based energy, the system comprising:
- one or more thermal collectors 5, 60,
- an energy carrier 29,
- a piping system 3, 7, 34, 35, 36,
- pumping device for controlling the flow of the energy carrier 29,
- one or more ground thermal storage systems 30, each ground thermal storage system 30 comprising a plurality of boreholes down into the sub terrain,
- controlling device 4 comprising at least a pumping device, for controlling flow of energy carrier 29 in the piping system 3, 7, 34, 35, 36, the thermal collectors 5, 60 and the one or more ground thermal storage systems 30, and
- a temperature based storage medium, wherein the temperature based storage medium is comprised of one or more volumes of sub terrain arranged around the one or more ground thermal storage system s 30.

A second system embodiment for storing and retrieving captured temperature based energy according to the first system embodiment, wherein the thermal collector 60 is a pressurized fluid filled mattress 60 comprising the energy carrier 29, the energy carrier 29 being circulating through the mattress 60 in canals 63 arranged inside the pressurized mattress 60, the internal layout of the pressurized mattress 60 comprise in downstream direction an input valve 61, an inflow manifold 62, one or more canals 63, an outflow manifold 64, and an outflow valve 65.

A third system embodiment for storing and retrieving captured temperature based energy according to any of the first or second system embodiment, wherein the piping system comprise
- one part between the thermal collector 60 and the ground thermal storage system,
- one part between the boreholes 28 of the ground thermal storage systems 30, and
- one part between the flow controller module 4 and the ground thermal storage system s 30.

A fourth system embodiment for storing and retrieving captured temperature based energy according to any of the first to third system embodiment, wherein the one or more ground thermal storage systems 30 are comprised of a plurality of boreholes arranged in borehole groups arranged in the sub terrain in a pattern defining in a horizontal cross section:
- a central area,
- one or more middle areas being radially arranged around the central area, and
- an outer area being arrange around the outer middle area, the boreholes protrude vertically down from the surface of the terrain into the sub terrain, and the piping system will transport the energy carrier 29:
- from the thermal collector 60 to the central most borehole group,
- from the central most borehole group to the innermost middle borehole group,
- from the middle borehole group radially outwards through the further middle borehole groups to the outer borehole group, and
- from the outer borehole group back to the thermal collector 60.

A fifth system embodiment for storing and retrieving captured temperature based energy according to the fourth system embodiment, wherein the ground thermal storage system 30 is comprised of:
- one or more boreholes 28, wherein each borehole 28 comprise a coaxial collector, wherein the coaxial collector comprise a flexible material cylindrical sheet, sleeve, the sleeve further comprising a top lid 26 and bottom wall 20, enabling an air tight environment inside the sleeve and being filled with the energy carrier 29, and pressurized air/gas, such that the outside of the sleeve is brought in contact with the inside of the borehole wall for optimal heat exchange between the energy carrier 29 and the sub terrain circumventing the borehole, the piping bringing the energy carrier 29 into the ground thermal storage system 30 is arranged to input the energy carrier 29 to an inflow coupling 21, 22 of an up-stream borehole 28 of the ground thermal storage system 30, the piping is further arranged to transfer the energy carrier 29 between boreholes 28 in down-stream direction, and output the energy carrier 29 from a borehole output coupling 21, 22 of a borehole 28 in downstream direction of the of the inflow coupling 21, 22 the energy carrier 29 was input.

A sixth system embodiment for storing and retrieving captured temperature based energy according to the fifth system embodiment, wherein the cylindrical sheet of the coaxial collector is closed in both ends 20, 26, and that a second piping system 23 is arranged to pump air or gas into the coaxial collector such that the level of the energy carrier 29 inside the borehole 28 has a controllable upper surface 24 depth.

A seventh system embodiment for storing and retrieving captured temperature based energy according to the fifth or sixth system embodiment, wherein the ground thermal storage system is a heat storage 30, and the inflow pipe 27 opening is arranged in the bottom of the borehole 28, and the outflow pipe 25 opening is arranged below and in the vicinity of the surface 24 of the energy carrier 29 inside the borehole 28 such that the flow is supported by the heat transfer by conductions.

An eighth system embodiment for storing and retrieving captured temperature based energy according to the seventh system embodiment, wherein the energy carrier 29 is water.

A ninth system embodiment for storing and retrieving captured temperature based energy according to the seventh or eighth system embodiment, wherein the piping comprise one or more further output pipes arranged at outflow couplings of one or more borehole groups, wherein energy carrier 29 can be drawn directly from the borehole group, and an input valve 61 is arranged in the input pipe leading to the thermal collector 60 where energy carrier 29 is replenished at the same rate as being drawn from borehole group, the output water having the temperature of borehole group temperature where the energy carrier 29 was drawn from.

A tenth system embodiment for storing and retrieving captured temperature based energy according to the eight system embodiment, wherein the piping comprise one or more further circulation pipes coupled to a first coupling 21, 22 of a borehole groups such that energy carrier 29 can be drawn directly from the piping and sent through the circulation piping before being reintroduced in a second coupling 21, 22 of a borehole groups such that the energy carrier 29 levels in the boreholes are maintained.

An eleventh system embodiment for storing and retrieving captured temperature based energy according to the fifth or sixth system embodiment, wherein the ground thermal storage system is a cold storage 30, and the outflow pipe 27 opening is arranged in the bottom of the borehole, and the inflow pipe 25 opening is arranged below and in the vicinity of the surface 24 of the energy carrier 29 inside the borehole such that the flow is supported by the heat transfer by conductions.

A twelfth system embodiment for storing and retrieving captured temperature based energy according to the eleventh system embodiment, wherein the energy carrier 29 is a fluid with a freezing temperature below 0° C.

A thirteenth system embodiment for storing and retrieving captured temperature based energy according to any of the first to twelfth system embodiment, wherein the system comprise one ground thermal storage system for heat storage and one ground thermal storage system for cold storage.

A fourteenth system embodiment for storing and retrieving captured temperature based energy according to any of the first to twelfth system embodiment, wherein the system comprise one ground thermal storage system for heat storage and one ground thermal storage system for cold storage, wherein the piping is connected to the thermal collector 60 such that heat is transferred to the heat storage during time periods where environment temperatures are able to heat the energy carrier 29 inside the thermal collector 60 above a first pre-set temperature threshold, and that cooled energy carrier 29 is transferred to the cold storage during time periods where environment temperatures are able to cool the energy carrier 29 inside the thermal collector 30 below a second pre-set temperature threshold.

A fifteenth system embodiment for storing and retrieving captured temperature based energy according to the fourteenth system embodiment, wherein the ground thermal storage system for cold storage is arranged below the ground thermal storage system for heat storage, and that piping to and from the cold storage is arranged through the boreholes 28 of the ground thermal storage system for heat storage, and the piping for these purposes are arranged inside additional heat isolation casing, pipe-in-pipe.

A sixteenth system embodiment for storing and retrieving captured temperature based energy according to any of the first to twelfth system embodiment, wherein the thermal collector is a solar collector.

The invention shall also be recognized by the following advantageous embodiments where there is in a first device embodiment a device for collecting temperature based energy, the device comprising:
  a thermal collector 60, the thermal collector 60 comprising an energy carrier 29 filling the entire free space inside the mattress, the energy carrier 29 being pressurized, and
  one or more canals 63 arranged inside the thermal collector 60, the internal layout of the thermal collector 60 comprise in downstream direction an input valve 61, an inflow manifold 62, one or more canals 63, an outflow manifold 64, and an outflow valve 65, such that the energy carrier 29 will enter through the input valve 61 and pass through the inflow manifold 61 and through the one or more canals 63 enter into the outflow manifold 64 and out of the outflow valve 65, and when circulating inside the thermal collector 60 have a temperature changing from a first temperature when entering the input valve 61 to output second temperature when exiting through the output valve 65, the output temperature being closer to the temperature of the environment outside the thermal collector 60 when exiting that when being entering through the input.

A second device embodiment of the device for collecting temperature based energy according to the first device embodiment, wherein the thermal collector 60 comprise one or more sections, each section comprising one or more canals 63 arranged inside the thermal collector 60, the internal layout of the thermal collector 60 comprise in downstream direction an input valve 61, an inflow manifold 62, one or more canals 63, an outflow manifold 64, and an outflow valve 65.

A third device embodiment of the device for collecting temperature based energy according to the first or second device embodiment, wherein the device further comprise an air/gas inflatable enclosure 80 arranged on top of the thermal collector 60, the air/gas inflatable enclosure being made of a transparent material.

A fourth device embodiment of the device for collecting temperature based energy according to the third device embodiment, wherein comprising a controller valve 85 and a gas source, wherein the air/gas inflatable enclosure 80 can be reciprocal inflated, in order to increase and reduce the volume of the air/gas inflatable enclosure 80 in a controlled manner by controlling the flow of air/gas in and out of the air/gas inflatable enclosure 80 via the controller valve 85.

A fifth device embodiment of the device for collecting temperature based energy according to the third or fourth device embodiment, wherein the air/gas inflatable enclosure comprise two or more separate enclosures 81, 82, 83, 84, the enclosures 81, 82, 83, 84 being arranged and connected adjacent to each other.

A sixth device embodiment of the device for collecting temperature based energy according to the fifth device embodiment, wherein the enclosures 81, 82, 83, 84 can be individually reciprocal inflated through corresponding individual arranged valve 85, in order to increase and reduce the volume of the individual air/gas inflatable enclosure 81, 82, 83, 84 in a controlled manner by controlling the flow of air/gas in and out of the gas inflatable enclosures 81, 82, 83, 84 via the controller valve 85.

The invention claimed is:

1. A sleeve pipe assembly for a borehole assembly, for use with a thermal collector for heat exchange with the surroundings, comprised of a coaxial collector, the coaxial collector further comprises:
  a flexible material cylindrical sheet, sleeve, for being arranged in a borehole, the sleeve further comprising a top lid and bottom wall, thus providing an air tight environment inside the sleeve,
  an energy carrier and pressurized air/gas inside the coaxial collector such that the outside of the sleeve can be brought in contact with the inside of a borehole wall for optimal heat exchange between the energy carrier and the sub terrain around the borehole,
  an inflow coupling arranged in the top lid and piping for transporting the energy carrier into the coaxial collector, and
  an outflow coupling arranged in the top lid and piping for transporting the energy carrier out of the coaxial collector,
  wherein the top lid further comprises a control valve and piping for filling pressurized air/gas into the coaxial collector and thus controlling the surface of the energy carrier inside coaxial collector, and
  wherein the opening of one of the piping for transporting the energy carrier in or out of the coaxial collector is level adjustable to be adjusted to reach below any set surface level of energy carrier in the coaxial collector.

2. The sleeve pipe assembly according to claim 1, wherein piping for bringing the energy carrier into the coaxial collector comprises a pipe-in-pipe assembly wherein a first pipe is arranged inside a second pipe, and the outside diameter of the first pipe is smaller than the inside diameter of the second pipe, and an air tight coupling is arranged at each peripheral end of the interacting length of the first pipe and the second pipe for increasing an insulation characteristics of the piping between an energy carrier in the coaxial collector and the energy carrier inside the inner pipe.

3. The sleeve pipe assembly according to claim 1, wherein the sleeve comprises a flexible endurable temperature resistant material.

4. The sleeve pipe assembly according to claim 1, wherein pipes are made of a light material.

5. A system for storing and retrieving captured temperature based energy, comprising:
one or more thermal collectors,
an energy carrier,
a piping system,
a pumping device for controlling the flow of the energy carrier,
one or more ground thermal storage systems, each ground thermal storage system comprising a plurality of boreholes down into the sub terrain,
a controlling device comprising at least a pumping device, for controlling flow of energy carrier in the piping system, the thermal collectors and the one or more ground thermal storage systems, and
a temperature based storage medium comprising one or more volumes of sub terrain arranged around the one or more ground thermal storage systems, and
wherein each borehole comprises a coaxial collector as defined in claim 1,
wherein a tight environment inside the sleeve being filled with the energy carrier, and pressurized air/gas, such that the outside of the sleeve is brought in contact with the inside of the borehole wall for optimal heat exchange between the energy carrier and the sub terrain around the borehole,
the piping bringing the energy carrier into the ground thermal storage system is arranged to input the energy carrier to an inflow coupling of an up-stream borehole of the ground thermal storage system,
the piping is further arranged to transfer the energy carrier between boreholes in a down-stream direction, and output the energy carrier from a borehole output coupling of a borehole in the down-stream direction of the inflow coupling from which the energy carrier was input.

6. The system for storing and retrieving captured temperature based energy according to claim 5, wherein the piping system comprises:
one part between the thermal collector and the ground thermal storage system,
one part between the boreholes of the ground thermal storage systems, and
one part between the flow controller module and the ground thermal storage systems.

7. The system for storing and retrieving captured temperature based energy according to claim 5, wherein the one or more ground thermal storage systems are comprised of a plurality of boreholes arranged in borehole groups arranged in the sub terrain in a pattern defining in a horizontal cross section:
a central area,
one or more middle areas being radially arranged around the central area, and
an outer area being arranged around the outer middle area,
the boreholes protrude vertically down from the surface of the terrain into the sub terrain, and the piping system will transport the energy carrier:
from the thermal collector to the central most borehole group,
from the central most borehole group to the innermost middle borehole group,
from the middle borehole group radially outwards through the further middle borehole groups to the outer borehole group, and
from the outer borehole group back to the thermal collector.

8. The system for storing and retrieving captured temperature based energy according to claim 5, wherein the ground thermal storage system is a heat storage, and the inflow pipe opening is arranged in the bottom of the borehole, and an outflow pipe opening is arranged below and in the vicinity of the surface of the energy carrier inside the borehole such that the flow is supported by the heat transfer by conductions.

9. The system for storing and retrieving captured temperature based energy according to claim 8, wherein the energy carrier is water.

10. The system for storing and retrieving captured temperature based energy according to claim 8, wherein the piping comprise one or more further output pipes arranged at outflow couplings of one or more borehole groups, wherein energy carrier can be drawn directly from the borehole group, and an input valve is arranged in the input pipe leading to the thermal collector where energy carrier is replenished at the same rate as being drawn from borehole group, the output water having the temperature of borehole group temperature where the energy carrier was drawn from.

11. The system for storing and retrieving captured temperature based energy according to claim 10, wherein the piping comprise one or more further circulation pipes coupled to a first coupling of a borehole group such that energy carrier can be drawn directly from the piping and sent through the circulation piping before being reintroduced in a second coupling of a borehole group such that the energy carrier levels in the boreholes are maintained.

12. The system for storing and retrieving captured temperature based energy according to claim 5, wherein the ground thermal storage system is a cold storage, and an outflow pipe opening is arranged in the bottom of the borehole, and the inflow pipe opening is arranged below and in the vicinity of the surface of the energy carrier inside the borehole such that the flow is supported by the heat transfer by conductions.

13. The system for storing and retrieving captured temperature based energy according to claim 12, wherein the energy carrier is a fluid with a freezing temperature below 0° C.

14. The system for storing and retrieving captured temperature based energy according to claim 5, wherein the system comprise one ground thermal storage system for heat storage and one ground thermal storage system for cold storage.

15. The system for storing and retrieving captured temperature based energy according to claim 5, wherein the system comprise one ground thermal storage system for heat storage and one ground thermal storage system for cold storage, wherein the piping is connected to the thermal collector such that heat is transferred to the heat storage during time periods where environment temperatures are able to heat the energy carrier inside the thermal collector above a first pre-set temperature threshold, and that cooled energy carrier is transferred to the cold storage during time periods where environment temperatures are able to cool the energy carrier inside the thermal collector below a second pre-set temperature threshold.

16. The system for storing and retrieving captured temperature based energy according to claim 15, wherein the ground thermal storage system for cold storage is arranged below the ground thermal storage system for heat storage, and that piping to and from the cold storage is arranged through the boreholes of the ground thermal storage system for heat storage, and the piping for these purposes are arranged inside additional heat isolation casing, pipe-in-pipe.

17. The system for storing and retrieving captured temperature based energy according to claim 5, wherein the thermal collector is a solar collector, or the thermal collector is adapted to collect heat/cold from any environment offering a warm and/or cold environment.

18. A system for storing and retrieving captured temperature based energy, comprising:
   one or more thermal collectors,
   an energy carrier,
   a piping system,
   a pumping device for controlling the flow of the energy carrier,
   one or more ground thermal storage systems, each ground thermal storage system comprising a plurality of boreholes down into the sub terrain,
   a controlling device comprising at least a pumping device, for controlling flow of energy carrier in the piping system, the thermal collectors and the one or more ground thermal storage systems, and
   a temperature based storage medium comprising one or more volumes of sub terrain arranged around the one or more ground thermal storage systems, and
wherein:
   each borehole comprises a coaxial collector as defined in claim 1,
   a tight environment inside the sleeve being filled with the energy carrier, and pressurized air/gas, such that the outside of the sleeve is brought in contact with the inside of the borehole wall for optimal heat exchange between the energy carrier and the sub terrain around the borehole,
   the piping bringing the energy carrier into the ground thermal storage system is arranged to input the energy carrier to an inflow coupling of an up-stream borehole of the ground thermal storage system,
   the piping is further arranged to transfer the energy carrier between boreholes in a down-stream direction, and output the energy carrier from a borehole output coupling of a borehole in the down-stream direction of the inflow coupling from which the energy carrier was input, and
   the cylindrical sheet of the coaxial collector is closed in a first end and a second end, and that a second piping system is arranged to pump air or gas into the coaxial collector such that the level of the energy carrier inside the borehole has a controllable upper surface depth.

* * * * *